United States Patent
Tzeng

(10) Patent No.: US 11,171,585 B2
(45) Date of Patent: Nov. 9, 2021

(54) MOTOR CONTROLLER

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

(*) Notice: Subject to any disclaimer, the term of this patent is extended or adjusted under 35 U.S.C. 154(b) by 128 days.

(21) Appl. No.: 16/828,988

(22) Filed: Mar. 25, 2020

(65) Prior Publication Data

US 2021/0305922 A1  Sep. 30, 2021

(51) Int. Cl.
*H02P 6/16* (2016.01)
*H02P 6/08* (2016.01)
*H02K 11/33* (2016.01)
*H02P 27/06* (2006.01)
*H02P 7/28* (2016.01)
*H02P 6/26* (2016.01)

(52) U.S. Cl.
CPC ............. *H02P 6/16* (2013.01); *H02K 11/33* (2016.01); *H02P 6/08* (2013.01); *H02P 6/26* (2016.02); *H02P 7/28* (2013.01); *H02P 27/06* (2013.01)

(58) Field of Classification Search
CPC ...... H02P 6/16; H02P 6/26; H02P 6/08; H02P 7/28; H02P 27/06; H02K 11/33
See application file for complete search history.

(56) References Cited

U.S. PATENT DOCUMENTS

| 6,020,700 | A | 2/2000 | Tien | |
|---|---|---|---|---|
| 7,411,367 | B2 | 8/2008 | Tsai | |
| 2015/0102817 | A1* | 4/2015 | Angerbauer | H01M 10/4285 |
| | | | | 324/426 |
| 2021/0041509 | A1* | 2/2021 | Jiang | G01R 33/072 |

FOREIGN PATENT DOCUMENTS

| CN | 102545770 A | 7/2012 |
|---|---|---|
| TW | 540902 | 7/2003 |
| TW | 201301739 A1 | 1/2013 |
| TW | 201315133 A1 | 4/2013 |

\* cited by examiner

*Primary Examiner* — Zoheb S Imtiaz
(74) *Attorney, Agent, or Firm* — Winston Hsu

(57) ABSTRACT

A motor controller used for driving a motor is provided. The motor controller includes a driving circuit, a control unit, an operational amplifier, a comparator, an inverter, a multiplexer, a first resistor, and a second resistor. The first and second resistors are mounted on a printed circuit board. By changing the resistance of the first resistor and the resistance of the second resistor, it is capable of changing the driving direction of the motor.

20 Claims, 2 Drawing Sheets

MOTOR CONTROLLER

BACKGROUND OF THE INVENTION

1. Field of the Invention

The present invention relates to a motor controller, and more particularly, to a motor controller which is capable of changing the driving direction of a motor.

2. Description of the Prior Art

Conventionally, a motor controller includes a Hall sensor that is used to measure the magnitude of a magnetic field based on the Hall effect. Once the circuit structure of the motor controller is decided, there is only one output mode for driving a motor by using a Hall signal generated by the Hall effect for further processing.

Thus, what is needed is the motor controller which is capable of changing the driving direction of the motor.

SUMMARY OF THE INVENTION

According to the present invention, a motor controller used for driving a motor is provided. The motor controller comprises a driving circuit, a control unit, an operational amplifier, a comparator, an inverter, a multiplexer, a first resistor, and a second resistor. The first and second resistors are mounted on a printed circuit board. By changing the resistance of the first resistor and the resistance of the second resistor, it is capable of changing the driving direction of the motor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
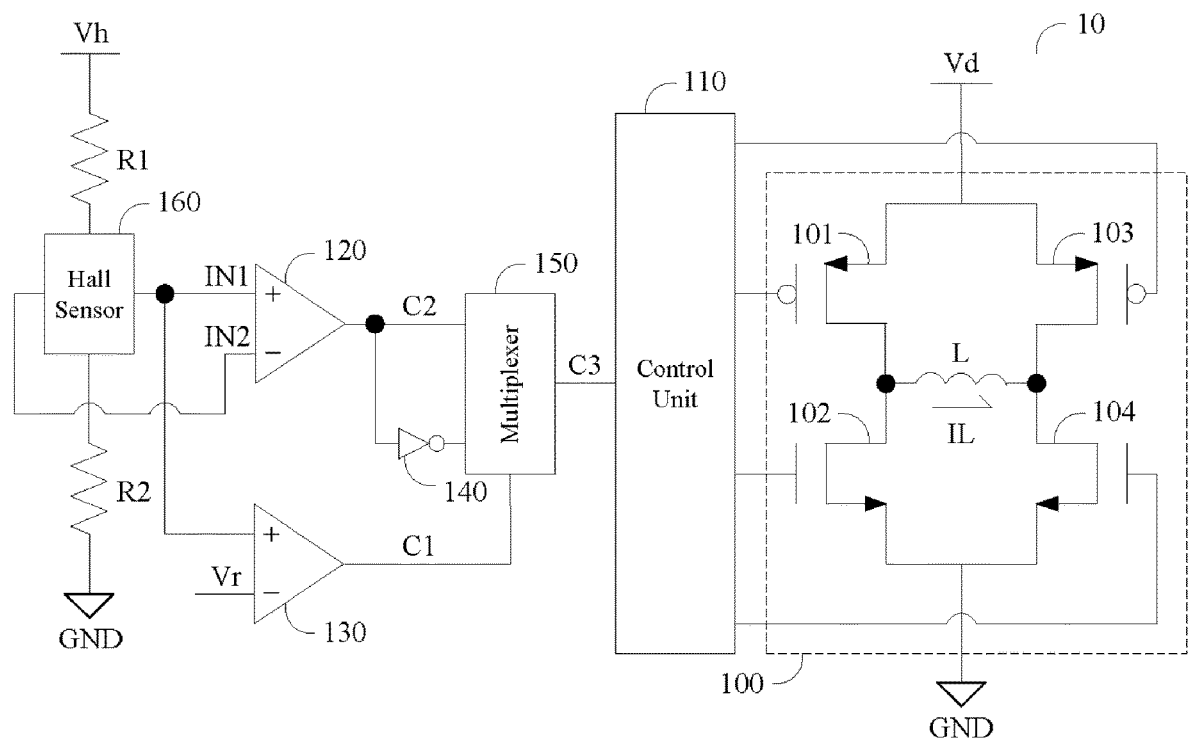
FIG. 1 is a schematic diagram showing a motor controller according to the first embodiment of the present invention.

FIG. 1 is a schematic diagram showing a motor controller according to the first embodiment of the present invention. The motor controller 10 is used for driving a motor, where the motor has a motor coil L. The motor controller 10 comprises a driving circuit 100, a control unit 110, an operational amplifier 120, a comparator 130, an inverter 140, and a multiplexer 150. The motor controller 10 further comprises a first resistor R1 and a second resistor R2, where the first resistor R1 and the second resistor R2 are mounted on a printed circuit board. The first resistor R1 is coupled to a voltage source Vh and a Hall sensor 160. The second resistor R2 is coupled to the Hall sensor 160 and a ground GND. The voltage source Vh, the first resistor R1, and the second resistor R2 are used to provide a bias to the Hall sensor 160.

The driving circuit 100 includes a first transistor 101, a second transistor 102, a third transistor 103, and a fourth transistor 104 for supplying a driving current IL to the motor coil L. The first transistor 101 and the third transistor 103 are coupled to a voltage source Vd and the motor coil L, while the transistor 102 and the fourth transistor 104 are coupled to the motor coil L and the ground GND. Transistors 101-104 may be respectively a p-type MOSFET or an n-type MOSFET. As shown in FIG. 1, each of the first transistor 101 and the third transistor 103 may be a p-type MOSFET, while each of the second transistor 102 and the transistor 104 may be an n-type MOSFET.

The control unit 110 is coupled to the driving circuit 100 so as to respectively control on/off states of transistors 101-104.

The Hall sensor 160 is coupled to the first resistor R1 and the second resistor R2, so as to generate a first output signal and the second output signal. The comparator 130 receives the first output signal and a reference voltage Vr for generating a first control signal C1. The operational amplifier 120 comprises a first input terminal IN1 and a second input terminal IN2, where the first input terminal IN1 is coupled to the first output signal and the second input terminal IN2 is coupled to the second output signal, so as to generate a second control signal C2. The inverter 140 receives the second control signal C2 for generating an inverted signal. The multiplexer 150 receives the first control signal C1, the second control signal C2, and the inverted signal for providing a third control signal C3 to the control unit 110.

For example, when the voltage source Vh is 5 volts, the resistance of the first resistor R1 is 700 ohms, the resistance of the second resistor R2 is 0 ohm, the equivalent resistance of the Hall sensor 160 is 300 ohms, the reference voltage Vr is 2.5 volts, and the common-mode voltage of the first input terminal IN1 and the second input terminal IN2 is about 1.5 volts, the control signal C1 is at a low level and thus the multiplexer 150 selects the second control signal C2 for driving the motor coil L.

When the voltage source Vh is 5 volts, the resistance of the first resistor R1 is 0 ohm, the resistance of the second resistor R2 is 700 ohms, the equivalent resistance of the Hall sensor 160 is 300 ohms, the reference voltage Vr is 2.5 volts, and the common-mode voltage of the first input terminal IN1 and the second input terminal IN2 is about 3.5 volts, the control signal C1 is at a high level and thus the multiplexer 150 selects the inverted signal for driving the motor coil L. By changing the resistance of the first resistor R1 and the resistance of the second resistor R2, it is capable of changing the direction of the driving current IL, thereby changing the driving direction of the motor. Therefore, there is no need to re-design the printed circuit board when desiring to change the driving direction of the motor. Cost reduction can be achieved by sharing common printed circuit boards.

Figure 2:
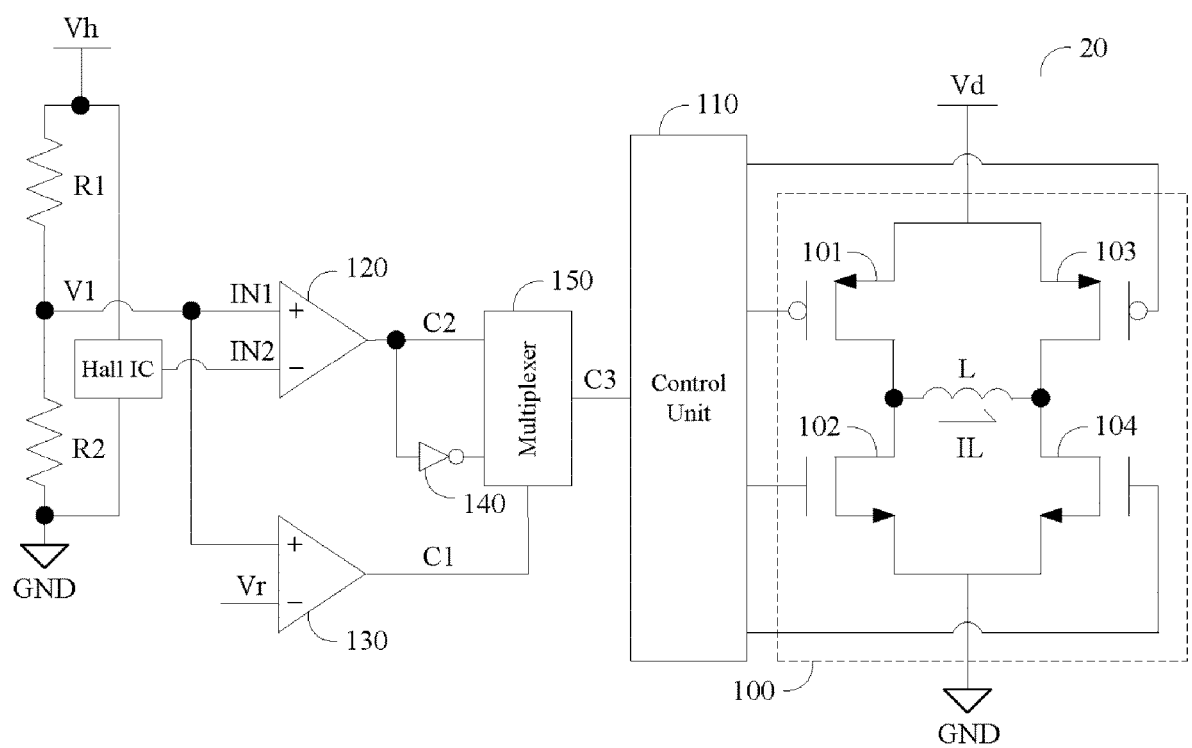
FIG. 2 is a schematic diagram showing a motor controller according to the second embodiment of the present invention.

FIG. 2 is a schematic diagram showing a motor controller according to the second embodiment of the present invention. As can be seen, the motor controller 20 of FIG. 2 is similar in construction to the motor controller 10 of FIG. 1. The first resistor R1 is coupled to the voltage source Vh, the operational amplifier 120, the comparator 130, and the second resistor R2. The second resistor R2 is coupled to the ground GND, the operational amplifier 120, and the comparator 130. The voltage source Vh, the first resistor R1, and the second resistor R2 are used to provide a voltage V1 to the operational amplifier 120 and the comparator 130. The second embodiment relates to an application of a Hall IC, where the Hall IC is coupled to the voltage source Vh and the ground GND, so as to generate a third output signal. The comparator 130 receives the voltage V1 and the reference voltage Vr for generating the first control signal C1. The operational amplifier 120 comprises the first input terminal IN1 and the second input terminal IN2, where the first input terminal IN1 is coupled to one terminal of the first resistor R1 and the second input terminal IN2 is coupled to the third output signal, so as to generate the second control signal C2. The inverter 140 receives the second control signal C2 for generating the inverted signal. The multiplexer 150 receives the first control signal C1, the second control signal C2, and the inverted signal for providing the third control signal to the control unit 110.

For example, when the voltage source Vh is 5 volts, the resistance of the first resistor R1 is 700 ohms, the resistance of the second resistor R2 is 300 ohms, the reference voltage Vr is 2.5 volts, and the voltage V1 is 1.5 volts, the first control signal C1 is at the low level and thus the multiplexer 150 selects the second control signal C2 for driving the motor coil L.

When the voltage source Vh is 5 volts, the resistance of the first resistor R1 is 300 ohms, the resistance of the second resistor R2 is 700 ohms, the reference voltage Vr is 2.5 volts, and the voltage V1 is 3.5 volts, the first control signal is at the high level and thus the multiplexer 150 selects the inverted signal for driving the motor coil L. By changing the resistance of the first resistor R1 and the resistance of the second resistor R2, it is capable of changing the direction of the driving current IL, thereby changing the driving direction of the motor.

While the present invention has been described by the preferred embodiments, it is to be understood that the invention is not limited to the disclosed embodiments. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor comprises a motor coil, and the motor controller comprises:
   a driving circuit, configured to supply a driving current to the motor coil;
   a control unit, coupled to the driving circuit;
   a first resistor, configured to provide a bias to a Hall sensor, wherein the Hall sensor is used for generating a first output signal and a second output signal; and
   a comparator, configured to receive the first output signal and a reference voltage for generating a first control signal, wherein the first resistor is configured to determine a high/low level of the first control signal and a direction of the driving current.

2. The motor controller of claim 1, further comprising a second resistor, configured to provide the bias to the Hall sensor.

3. The motor controller of claim 1, further comprising an operational amplifier, comprising:
   a first input terminal; and
   a second input terminal, wherein the first input terminal is coupled to the first output signal and the second input terminal is coupled to the second output signal, so as to generate a second control signal.

4. The motor controller of claim 3, further comprising an inverter, configured to receive the second control signal for generating an inverted signal.

5. The motor controller of claim 4, further comprising a multiplexer, configured to receive the first control signal, the second control signal, and the inverted signal for providing a third control signal to the control unit.

6. The motor controller of claim 1, wherein the first resistor is mounted on a printed circuit board.

7. The motor controller of claim 1, wherein the first resistor is coupled to the Hall sensor and a first voltage source.

8. The motor controller of claim 2, wherein the second resistor is coupled to the Hall sensor and a ground.

9. The motor controller of claim 1, wherein the driving circuit comprises:
   a first transistor, coupled to a second voltage source and the motor coil;
   a second transistor, coupled to the motor coil;
   a third transistor, coupled to the second voltage source and the motor coil; and
   a fourth transistor, coupled to the motor coil.

10. The motor controller of claim 9, wherein the control unit is configured to respectively control on/off states of the first transistor, the second transistor, the third transistor, and the fourth transistor.

11. The motor controller configured to drive a motor, wherein the motor comprises a motor coil, and the motor controller comprises:
   a driving circuit, configured to supply a driving current to the motor coil;
   a control unit, coupled to the driving circuit;
   a first resistor, configured to provide a voltage; and
   a comparator, configured to receive the voltage and a reference voltage for generating a first control signal, wherein the first resistor is configured to determine a high/low level of the first control signal and a direction of the driving current.

12. The motor controller of claim 11, further comprising a second resistor, coupled to the first transistor and a ground for providing the voltage.

13. The motor controller of claim 11, wherein the first transistor is coupled to a first voltage source, and the voltage source is coupled to a Hall IC for generating a third output signal.

14. The motor controller of claim 13, further comprising an operational amplifier, comprising:
   a first input terminal; and
   a second input terminal, wherein the first input terminal is coupled to one terminal of the first resistor and the second input terminal is coupled to the third output signal, so as to generate a second control signal.

15. The motor controller of claim 14, further comprising an inverter, configured to receive the second control signal for generating an inverted signal.

16. The motor controller of claim 15, further comprising a multiplexer, configured to receive the first control signal, a second control signal, and the inverted signal for providing a third control signal to the control unit.

17. The motor controller of claim 11, wherein the first resistor is mounted on a printed circuit board.

18. The motor controller of claim 12, wherein the second resistor is mounted on a printed circuit board.

19. The motor controller of claim 11, the driving circuit comprises:
- a first transistor, coupled to a second voltage source and the motor coil;
- a second transistor, coupled to the motor coil;
- a third transistor, coupled to the second voltage source and the motor coil; and
- a fourth transistor, coupled to the motor coil.

20. The motor controller of claim 19, wherein the control unit is configured to respectively control on/off states of the first transistor, the second transistor, the third transistor, and the fourth transistor.

* * * * *